C. M. WALKER.
CATERPILLAR TRACTOR.
APPLICATION FILED OCT. 23, 1917.

1,279,619.

Patented Sept. 24, 1918.

WITNESSES:
John B. Oade

INVENTOR
Cassius M. Walker
BY
W. W. Brighton
ATTORNEY

UNITED STATES PATENT OFFICE.

CASSIUS M. WALKER, OF PUEBLO, COLORADO.

CATERPILLAR-TRACTOR.

1,279,619.  Specification of Letters Patent.  Patented Sept. 24, 1918.

Original application filed June 5, 1917, Serial No. 172,869. Divided and this application filed October 23, 1917. Serial No. 198,004.

*To all whom it may concern:*

Be it known that I, CASSIUS M. WALKER, a citizen of the United States, and a resident of Pueblo, in the county of Pueblo and State of Colorado, have invented a certain new and useful Improvement in Caterpillar-Tractors, of which the following is a full, clear, and exact description.

My invention is an improvement in caterpillar tractors and it relates to novel means for altering a pleasure or commercial automobile into a caterpillar tractor. The principal objects of my invention are the provision of an attachment of the character described which may be readily applied to an automobile without altering the construction of the car or rendering it unfit for further use as an automobile, and one which may be conveniently driven from the rear axle of a pleasure car or from the rear axle or jack shaft of a truck as occasion may demand. Further and more particular objects and advantages of my invention will later appear in this specification.

In the single sheet of drawings accompanying this application and forming a part hereof—

Figure 1:
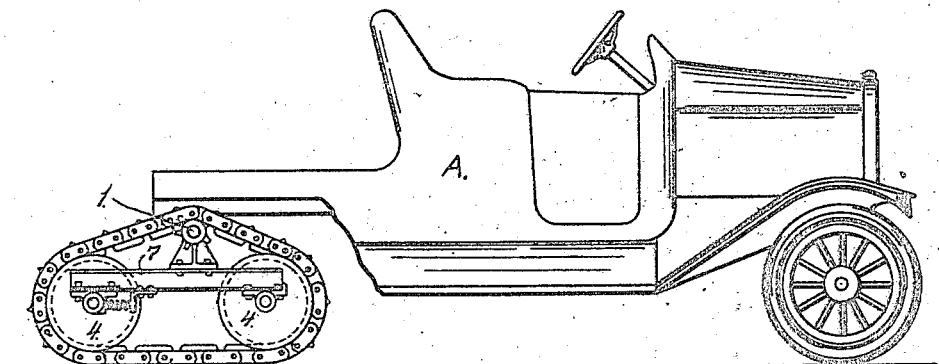
Figure 1 is a side elevation, partly broken away, showing a pleasure automobile equipped with my invention.
Figure 2:
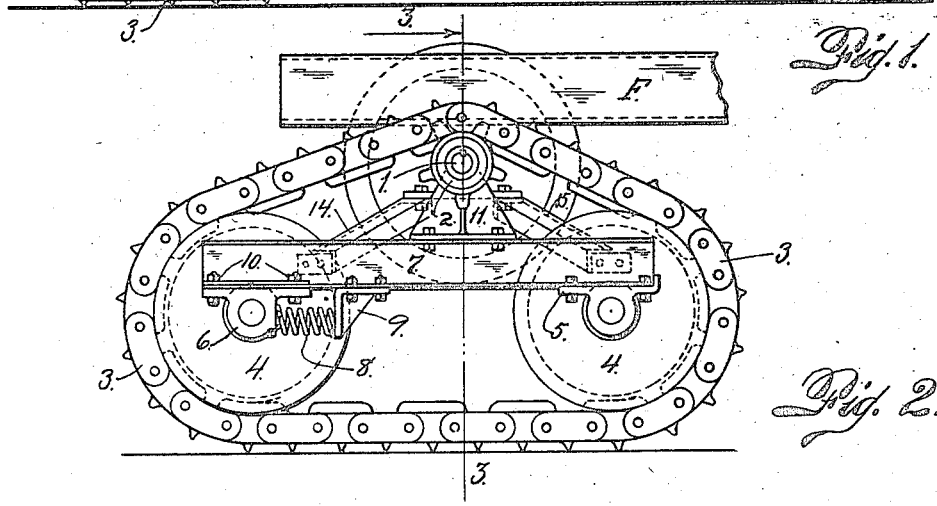
Fig. 2 is a side elevation, on an enlarged scale, of the rear portion of Fig. 1.
Figure 3:
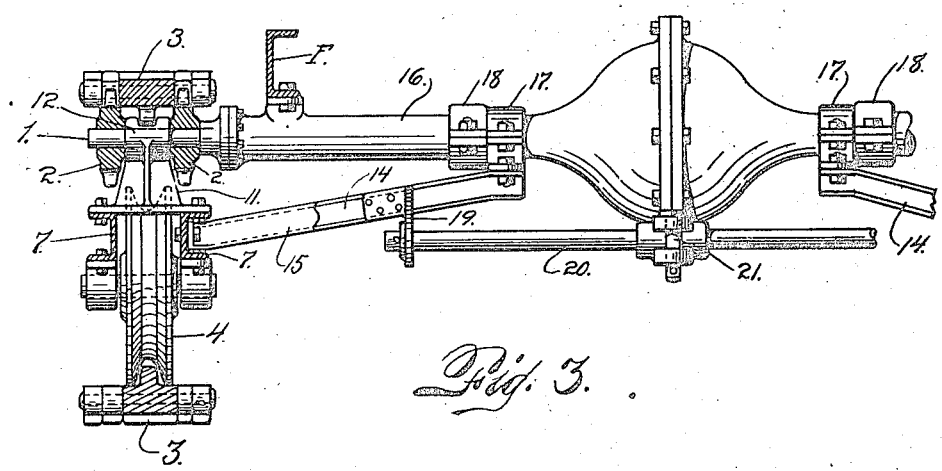
Fig. 3 is a vertical section on the line 3—3 of Fig. 2, the rear axle casing being shown in elevation.

Referring to the drawings, in which like characters of reference designate like parts in the several views, 1 indicates the rear axle of an automobile A and 2 a pair of spaced sprockets mounted on each end of said axle. The traction chain is indicated by the reference numeral 3, the present drawing illustrating the construction of the chain in a diagrammatic way only as any form of chain may be utilized with the features of invention covered by this application. In my previous application, Serial Number 172,869, filed June 5, 1917, of which application the present is a division, I have shown and claimed a special form of chain which is particularly adapted for use in connection with the equipment shown and claimed in this application, inasmuch as the chain therein claimed has its links connected by universal joints so as to be capable of being laid in a circle. Being thus formed and being driven by a shaft of which a differential forms a part, there is little or no strain transmitted to the frame of the equipment or to the automobile frame F when making turns, as the chain does not need to either slip or twist on the ground under its load.

The traction chains run over idlers 4 which bear on the chain and which are journaled in bearings 5, 6 mounted at opposite ends of a pair of longitudinal frame members 7. In order to take up slack which may result from wear or other causes and to permit stones or other unyielding bodies to pass between the chains and the drums without breaking parts, I prefer to make the rear bearings 6 automatically adjustable as indicated, a strong spring 8 being interposed between the bearing 6 and a bracket 9 carried by frame members 7. The bearing 6 is mounted on the members 7 by means of bolts 10 which pass through lugs on the bearing boxes and elongated slots in the horizontal flanges of the channels which constitute the members 7; thus the spring 8 tends always to move the journal 6 to stretch the traction chain but is able to yield as occasion demands.

Carried by each pair of members 7 there is a bracket 11 which supports a bearing 12 in which one end of the rear axle 1 of the automobile is journaled between the sprocket wheels 2; and diagonal braces 14, 15 extend from the ends of the inner members 7 to points adjacent the middle of the rear axle casing 16 to which they are joined by split bearings 17 held in place by collars 18 bolted to the casing. In brackets 19 carried by the rear diagonals 14 there is mounted a cross rod 20 on which there is provided a draw bar attachment 21 to which the load to be drawn may be secured.

Having thus described my invention, what I claim and desire to secure by Letters Patent is:—

1. In combination, an automobile from which the rear wheels have been removed, a sprocket wheel mounted on each end of the rear axle of said automobile, an endless traction chain running over each sprocket and adapted to be driven thereby, a pair of idlers bearing on each traction chain, a frame carried by each pair of idlers, a bracket on each frame in position to support an end of the rear axle of said automobile, and diagonal braces from the front and rear of each frame to the rear axle casing of said automobile, the connection between said braces and casing being such as to permit of a relative turning movement between these parts.

2. In combination, an automobile from which the rear wheels have been removed, a sprocket wheel mounted on each end of the rear axle of said automobile, an endless traction chain running over each sprocket and adapted to be driven thereby, a pair of idlers bearing on each traction chain, a frame carried by each pair of idlers, diagonal braces from the front and rear of each frame to the rear axle casing of said automobile, a bracket carried on each frame in position to support one side of the rear of said automobile, and draw bar connections secured to said frames.

3. In combination, an automobile from which the rear wheels have been removed, a pair of sprocket wheels mounted on each end of the rear axle of said automobile, an endless chain running over each pair of sprockets and adapted to be driven thereby, a pair of idlers bearing on each traction chain, a frame carried by each pair of idlers, and a bracket on each frame in position to form a bearing for an end of the rear axle of said automobile between the adjacent pair of sprockets.

In testimony whereof, I have hereunto affixed my signature.

CASSIUS M. WALKER.